Patented Jan. 18, 1949

2,459,771

UNITED STATES PATENT OFFICE 2,459,771

PHTHALOCYANINE SULFONAMIDO-
PYRIDINES

Arthur L. Fox, Easton, Pa., assignor to General
Aniline & Film Corporation, New York, N. Y., a
corporation of Delaware No Drawing. Application July 11, 1945,
Serial No. 604,513

2 Claims. (Cl. 260—314.5)

This invention relates to new phthalocyanine derivatives.

The term phthalocyanine is used herein in the generic sense to define tetraazaporphins in which each of the four pyrrole nuclei is fused to an aromatic nucleus, e. g., phenyl, biphenyl, naphthyl, anthranyl, etc., of which phthalocyanine itself (tetrabenzotetraazaporphin) is a well-known example. The phthalocyanine molecule may be metal free or contain a metal in complex combination, for example, copper, cobalt, nickel, iron, aluminum, etc.

It is an object of the present invention to provide new phthalocyanine sulfonamides. A further object is the provision of a process for the manufacture of the new phthalocyanine sulfonamides.

I have found that the above and other objects of the invention may be accomplished by reacting a phthalocyanine sulfonylchloride with a reactive amino group contained on or in a heterocyclic nucleus. The heterocyclic nuclei are capable of imparting valuable characteristics to the resulting phthalocyanine sulfonamides as will become evident as the description proceeds.

Any heterocyclic compound which contains in the molecule an amino group bearing at least one free hydrogen atom may be employed for the preparation of the compounds of the present invention. Thus, substituted sulfonamides of the phthalocyanines may be prepared with heterocyclic amines such as aminotetrahydrofuran, aminopyrazine, aminothiazole, 2 - amino - 6 - ethoxy-benzothiazole, aminothiophene, 2-, 3-, or 4- aminopyridine, etc., or with those in which the amino group is incorporated in the ring, for example, piperidine, methyl piperidine, piperazine, tetrahydroquinoline, morpholine, etc., or with those in which the amino portion is neither attached to nor is contained in the heterocyclic ring but is attached to an additional group forming part of the molecule of the heterocylic amine, for example, 1 - (3' - aminophenyl) -3-methyl-5-pyrazolone.

The preparation of the new sulfonamides from the phthalocyanine sulfonylchloride and the heterocyclic amine may be carried out at elevated temperature, but preferably is conducted at room or even lower temperatures. The reactions may be carried out in aqueous solution or suspension, in the presence of an organic solvent such as alcohol, acetone, nitrobenzene, etc., as may be found most suitable, or in some instances in the complete absence of a diluent.

The new compounds are phthalocyanines containing attached to the arylene nuclei at least one sulfonamide group which is substituted by the heterocyclic residue of the starting amine. The number of these sulfonamide groups may vary from one to four or more depending on the number of sulfonylchloride groups present on the arylene nuclei of the starting phthalocyanine. In some instances the products may also contain attached to the arylene nuclei one or more sulfonic acid groups, either free or as the amine salt, not all the sulfonylchloride groups being converted in the reaction to sulfonamide groups, or other substitutents such as halogen atoms, e. g., chlorine, or amino or carboxy groups, etc.

Depending upon the nature of the heterocyclic residue present in the sulfonamide groups, the new products will vary in their properties. For example, it is possible to prepare water-soluble phthalocyanine derivatives by incorporating on the arylene nuclei sulfonamide groups derived from such heterocyclic water-solubilizing groups as morpholine and 2-aminopyridine. On the other hand, phthalocyanine sulfonamides which are relatively insoluble in both aqueous solutions and organic solvents may be prepared by the use of 6-aminoquinoline or 2-amino-6-ethoxy benzthiazole. Again, others of the derivatives, such as that obtained from piperidine and copper phthalocyanine tetrasulfonylchloride will be quite soluble in certain organic solvents such as acetone, alcohol, pyridine, etc. Additionally, sulfonamide derivatives of the phthalocyanines may be prepared which due to their heterocyclic nucleus are capable of coupling with various diazonium salts to yield diazo dyes possessing valuable dyeing properties towards certain fibers. Of this particular type may be mentioned those prepared from 1-(3'-aminophenyl)-3-methyl - 5 - pyrazolone.

The new phthalocyanine colors are of a brilliant blue to greenish-blue shade and are capable of dyeing various textile fibers such as cotton, wool and silk. Where the molecule additionally contains sulfonic acid groups, either free or in the form of the amine salt, they are capable of being converted into color lakes with, for example, calcium or barium salts. Certain of these new sulfonamides are eminently suited for the coloring of writing inks, for example, the sulfonamides from the tetrasulfonylchloride of copper phthalocyanine, on the one hand, and 2-aminopyridine, morpholine or piperidine on the other, the dyestuffs being employed for this purpose in the form of their soluble salts, particularly, sodium, potassium, ammonium and lithium. A further characteristic of these ink colors is their stability in dilute aqueous caustic alkali solutions over relatively long periods of time, a property rendering them particularly suited for coloring of writing inks rendered quick drying by a small content of caustic alkali, e. g., caustic soda. As colors in such quick-drying inks, they are quite resistant to leaching by water and characterized by their light fastness and outstanding brightness.

The starting phthalocyanine sulfonylchlorides employed in the preparation of the phthalocyanine sulfonamides may be obtained by reacting chlorosulfonic acid with the corresponding phthalocyanines at an elevated temperature as described in U. S. P. 2,219,330. They may also be made from the corresponding phthalocyanine sulfonic acids or their salts by treatment with phosphorus pentachloride.

The invention is further illustrated by the following specific examples to which, however, it is not be limited. Parts are by weight unless otherwise noted.

Example 1

Ten parts of copper phthalocyanine tetrasulfonylchloride is slowly stirred into a solution of 10 parts of 2-aminopyridine in 100 parts of nitrobenzene and the resulting mixture stirred for 10-12 hours at room temperature. The nitrobenzene is then removed from the reaction mixture by means of a steam distillation and the resulting solution evaporated to a thick syrupy residue. Upon cooling, the residue is poured into 100 volumes of 10% hydrochloric acid and the precipitate filtered and dried. A bright blue dyestuff is obtained which is quite soluble in dilute aqueous caustic alkali and contains attached to the phenylene nuclei between three and four sulfonamidopyridine groups.

Example 2

Ten parts of copper phthalocyanine tetrasulfonylchloride is stirred into a solution of 6 parts of 1-(3'-aminophenyl)-3-methyl-5-pyrazolone and 5.5 parts of sodium acetate in 50 parts of acetone. The mixture is then stirred at room temperature until the reaction is complete whereupon the acetone is evaporated, and the resulting powder stirred into 100 volumes of water and the resulting solution acidified by means of 10% hydrochloric acid. The resulting precipitate is filtered and dried. A bluish-green powder is obtained which is also quite soluble in dilute aqueous caustic alkali. It is furthermore capable of coupling with diazo salts to form valuable dyes.

Example 3

Ten parts of copper phthalocyanine tetrasulfonylchloride is stirred into 50 parts of water in which has been dissolved 10 parts of morpholine. The whole mixture is then stirred at room temperature for several hours after which the mixture is stirred into 100 volumes of 10% hydrochloric acid. The resulting precipitate is filtered and dried. A greenish-blue powder is obtained which is soluble in dilute aqueous caustic alkali.

Example 4

Ten parts of 2-amino-6-ethoxybenzthiazole, 10 parts of copper phthalocyanine tetrasulfonylchloride and 5 parts of sodium carbonate is stirred into 100 parts of nitrobenzene. This mixture is then heated to 60° C. with efficient stirring and then permitted to cool gradually back to room temperature. Stirring is continued for 10-12 hours at room temperature whereupon the mixture is acidified with 10% hydrochloric acid, filtered and dried. A dark blue powder is thus obtained.

Example 5

Ten parts of copper phthalocyanine tetrasulfonylchloride is stirred into a solution of 10 parts of piperidine in 100 parts of methanol and stirring continued at room temperature for several hours until the reaction is complete. The methanol is then removed by heating on a steam bath and the residue stirred into 200 volumes of water. The resulting water-insoluble precipitate is filtered and dried. A blue powder is obtained which is soluble in acetone, methanol, ethanol and other organic solvents.

As various other embodiments of the invention will occur to those skilled in the art, it is not intended that the scope of the patent be limited except as is required by the prior art and the appended claims.

I claim:

1. Copper phthalocyanine containing attached to the phenylene nuclei between three and four sulfonamidopyridine groups.

2. Copper phthalocyanine containing attached to the phenylene nuclei between three and four 2-sulfonamidopyridine groups.

ARTHUR L. FOX.

REFERENCES CITED

The following references are of record in the file of this patent:

FOREIGN PATENTS

| Number | Country | Date |
|---|---|---|
| 496,663 | Great Britain | Dec. 5, 1938 |
| 520,199 | Great Britain | Apr. 17, 1940 |
| 208,955 | Switzerland | June 1, 1940 |